US012782114B2

(12) United States Patent
Oh et al.

(10) Patent No.: US 12,782,114 B2
(45) Date of Patent: Nov. 3, 2026

(54) DEVICE AND METHOD FOR MEASURING SEALING GAP FOR SECONDARY BATTERY

(71) Applicant: LG Energy Solution, Ltd., Seoul (KR)

(72) Inventors: Young Joo Oh, Daejeon (KR); Kyu Sang Lee, Daejeon (KR); Jum Yeal Lee, Daejeon (KR); Gyu Hyung Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 217 days.

(21) Appl. No.: 18/709,195

(22) PCT Filed: Mar. 21, 2023

(86) PCT No.: PCT/KR2023/003749

§ 371 (c)(1),
(2) Date: May 10, 2024

(87) PCT Pub. No.: WO2023/182784

PCT Pub. Date: Sep. 28, 2023

(65) Prior Publication Data

US 2025/0003733 A1 Jan. 2, 2025

(30) Foreign Application Priority Data

Mar. 21, 2022 (KR) ........................ 10-2022-0035013
Mar. 21, 2023 (KR) ........................ 10-2023-0036787

(51) Int. Cl.
*H01M 10/42* (2006.01)
*G01B 11/02* (2006.01)
(Continued)

(52) U.S. Cl.
CPC .............. *G01B 11/02* (2013.01); *G01B 11/14* (2013.01); *H01M 10/4285* (2013.01); *H01M 50/186* (2021.01)

(58) Field of Classification Search
CPC ......... G01B 11/02; G01B 11/06; G01B 11/14; H01M 10/4285; H01M 10/04;
(Continued)

(56) References Cited

U.S. PATENT DOCUMENTS 10,839,501 B2 * 11/2020 Futase ............... B29C 66/93451
11,835,468 B2 * 12/2023 Park .................... H01M 50/105
(Continued)

FOREIGN PATENT DOCUMENTS

CN 113390351 B 12/2021
JP 4239028 B2 3/2009
(Continued)

OTHER PUBLICATIONS

International Search Report for PCT/KR2023/003749 mailed Jun. 29, 2023. 3 pages.

*Primary Examiner* — Rebecca C Bryant
(74) *Attorney, Agent, or Firm* — Lerner David LLP

(57) ABSTRACT

A device for measuring a sealing gap for a secondary battery, includes: a first measurement device, an origin point structure, a second measurement device and a controller. The first measurement device acquires an inner start point and an outer end point of the sealing part. The origin point structure has a vertical reference surface corresponding to a point moved by a predetermined first distance (X1) in a direction of the electrode assembly accommodation part from a first reference origin point (O1) disposed between the inner start point and the outer end point. The second measurement device acquires a second distance (X2) from the vertical reference surface to the electrode assembly accommodation part. The controller acquires the sealing gap based on the first distance (X1), the second distance (X2), and a third distance (X3) from the inner start point to the first reference origin point (O1).

18 Claims, 6 Drawing Sheets

(51) Int. Cl.
*G01B 11/14* (2006.01)
*H01M 50/186* (2021.01)

(58) Field of Classification Search
CPC ............. H01M 50/105; H01M 50/131; H01M 50/186; Y02E 60/10
See application file for complete search history.

(56) References Cited

U.S. PATENT DOCUMENTS

| | | | | |
|---|---|---|---|---|
| 2013/0141571 | A1* | 6/2013 | Yasooka | G01M 3/36 73/37.5 |
| 2015/0022652 | A1 | 1/2015 | Joo | |
| 2019/0170703 | A1 | 6/2019 | Koo et al. | |
| 2021/0154946 | A1 | 5/2021 | Taguchi | |

FOREIGN PATENT DOCUMENTS

| | | | |
|---|---|---|---|
| JP | 2011033459 | A | 2/2011 |
| JP | 6796050 | B2 | 12/2020 |
| KR | 102039526 | B1 | 11/2019 |
| KR | 102091768 | B1 | 3/2020 |
| KR | 102122292 | B1 | 6/2020 |
| KR | 102141380 | B1 | 8/2020 |
| KR | 102145960 | B1 | 8/2020 |
| KR | 20210065988 | A | 6/2021 |
| KR | 102287763 | B1 | 8/2021 |
| KR | 20210150106 | A | 12/2021 |

* cited by examiner

DEVICE AND METHOD FOR MEASURING SEALING GAP FOR SECONDARY BATTERY

CROSS-REFERENCE TO RELATED APPLICATIONS

The present application is a national phase entry under 35 U.S.C. § 371 of International Application No. PCT/KR2023/003749, filed on Mar. 21, 2023, which claims priority from Korean Patent Application Nos. 10-2022-0035013, filed on Mar. 21, 2022, and 10-2023-0036787, filed on Mar. 21, 2023, all of which are incorporated herein by reference.

TECHNICAL FIELD

The present disclosure relates to a device and method for measuring a sealing gap for a secondary battery, in which a sealing gap disposed between an electrode assembly accommodation part and a sealing part of a pouch is capable of being accurately measured.

BACKGROUND ART

In general, secondary batteries refer to chargeable and dischargeable, unlike primary batteries that are not chargeable. The secondary batteries are being widely used for mobile phones, notebook computers, and camcorders, electric vehicles, and the like.

The secondary batteries are classified into a can type secondary battery, in which an electrode assembly is embedded in a metal can, a pouch type secondary battery in which an electrode assembly is embedded in a pouch, and a button type secondary battery having a coin shape.

Also, a pouch type secondary battery includes an electrode assembly and a pouch accommodating the electrode assembly. That is, the electrode assembly has a structure in which a positive electrode and a negative electrode are alternately disposed with a separator therebetween. The pouch includes an accommodation part accommodating the electrode assembly and a sealing part sealing the accommodation part while being formed on an edge of the accommodation part.

In the secondary battery, three of four edges formed on the pouch are sealed first in an assembly process to form a sealing part, and a remaining one edge formed on the pouch is sealed in a degassing process to form a sealing part.

Here, the sealing part formed on the pouch has to be formed in consideration of a full width of the electrode assembly, insulation failure, and sealing failure. The full width of the electrode assembly may include a sealing gap disposed between the accommodation part and the sealing part.

The sealing gap requires a certain width to ensure safety. That is, the sealing gap has a width set according to a thickness of the accommodation part. In particular, the sealing gap may have different values in the assembly process and the degassing process. That is, in the assembling process, the electrode assembly, an electrolyte, and a gas may be filled in the accommodation part, and in the degassing process, the gas inside the accommodation part may be discharged to cause a difference in sealing gap.

Here, the difference in sealing gap in the assembly process and the degassing process may cause defects in a process of folding the sealing part, and thus, it is necessary to accurately measure the sealing gap in the degassing process.

In the related art, the sealing gap disposed between the accommodation part and the sealing part of the pouch was measured using a steel ruler. However, the steel ruler has a problem in that a measured value varies depending on the number of measurements or each operator, and thus, it is difficult to accurately measure the sealing gap.

DISCLOSURE OF THE INVENTION

Technical Problem

An object of the present invention is to provide a device and method for measuring a sealing gap for a secondary battery, in which a sealing gap disposed between an electrode assembly accommodation part and a sealing part of a pouch is capable of being accurately measured.

Technical Solution

An aspect of the present invention provides a device for measuring a sealing gap for a secondary battery, which measures a sealing gap disposed between an electrode assembly accommodation part and a sealing part of a pouch, and the device includes: a first measurement device configured to acquire an inner start point and an outer end point of the sealing part; an origin point structure having a vertical reference surface corresponding to a point moved by a predetermined first distance (X1) in a direction of the electrode assembly accommodation part from a first reference origin point (O1) disposed between the inner start point and the outer end point; a second measurement device configured to acquire a second distance (X2) from the vertical reference surface to the electrode assembly accommodation part; and a controller configured to acquire the sealing gap based on the first distance (X1), the second distance (X2), and a third distance (X3) from the inner start point to the first reference origin point (O1).

The controller may be configured to set the first reference origin point between the inner start point to the outer end point and acquire the third distance (X3) from the inner start point to the first reference origin point (O1).

The first measurement device may include: a first displacement sensor configured to irradiate a beam to one surface of the pouch so as to measure the inner start point and the outer end point of the sealing part; and a second displacement sensor configured to irradiate a beam to the other surface of the pouch so as to measure the inner start point and the outer end point of the sealing part.

If the inner start point and the outer end point of the sealing part, which are measured by the first displacement sensor and the second displacement sensor do not match, the controller may be configured to set points at which the inner start point and the outer end point, which are respectively measured by the first displacement sensor and the second displacement sensor, overlap each other, as the inner start point and the outer end point of the sealing part.

A thickness of a sealing width may be acquired based on a distance between a sealing width measured by the first displacement sensor and a sealing width measured by the second displacement sensor.

The second measurement device may be configured to irradiate beam toward the vertical reference surface so as to set a point at which the vertical reference surface is disposed as a second reference origin point (O2) and irradiate a beam to the electrode assembly accommodation part so that the beam passes through the second reference origin point (O2) so as to acquire the second distance (X2) from the second reference origin point (O2) to the electrode assembly accommodation part.

The second measurement device may include a third displacement sensor configured to irradiate a beam toward the vertical reference surface so as to set a point at which the vertical reference surface is disposed as the second reference origin point (O2).

The controller may be configured to acquire a value obtained by subtracting the third distance (X3) from the sum of the first distance (X1) and the second distance (X2) as the sealing gap.

The second reference origin point (O2) may be set so as not to be disposed within the sealing width.

The origin point structure may further include a horizontal reference surface extending from the vertical reference surface in the direction of the sealing width and having a through-hole through which the beam irradiated from the first displacement sensor passes.

The controller may be configured to determine that the sealing gap measured by the second measurement device is defective when the sealing gap is less or greater than a previously input sealing gap.

A method for measuring a sealing gap for a secondary battery, in which a sealing gap disposed between an electrode assembly accommodation part and a sealing part of a pouch is measured according to an aspect of the present invention includes: a first measurement process of acquiring an inner start point and an outer end point of the sealing part; an origin point setting process of setting a vertical reference surface corresponding to a point moved by a predetermined first distance (X1) in a direction of the electrode assembly accommodation part from a first reference origin point disposed between the inner start point and the outer end point; a second measurement process of acquiring a second distance (X2) from the vertical reference surface to the electrode assembly accommodation part; and a sealing gap measurement process of acquiring the sealing gap based on the first distance (X1), the second distance (X2), and a third distance (X3) from the inner start point to the first reference origin point (O1).

In the first measurement process, the first reference origin point between the inner start point to the outer end point is set, and the third distance (X3) from the inner start point to the first reference origin point (O1) may be acquired.

The first measurement process may further include: a first process of irradiating a beam to one surface of the pouch to measure the inner start point and the outer end point of the sealing part; a second process of irradiating a beam to the other surface of the pouch to measure the inner start point and the outer end point of the sealing part; and a third process of setting points at which the inner start point and the outer end point of the sealing part overlap each other as the inner start point and the outer end point of the sealing part if the inner start point and the outer end point of the sealing part, which are measured in the first process and the second process, do not match.

The first measurement process may further include a process of acquiring a thickness of a sealing width based on a distance between a sealing width measured in the first process and a sealing width measured in the second process.

In the second measurement process, a beam may be irradiated toward the vertical reference surface to set a point at which the vertical reference surface is disposed as a second reference origin point (O2), and beam may be irradiated to the electrode assembly accommodation part so that the beam passes through the second reference origin point (O2) to acquire the second distance (X2) from the second reference origin point (O2) to the electrode assembly accommodation part.

In the second measurement process, the second reference origin point (O2) may be set so as not to be disposed between the inner start point and the outer end point of the sealing part.

In the sealing gap measurement process, a value obtained by subtracting the third distance (X3) from the sum of the first distance (X1) and the second distance (X2) may be acquired as the sealing gap.

The method may further include an inspection process of determining whether the measured sealing gap is defective after the sealing gap measurement process is completed, wherein, in the inspection process, when the measured sealing gap is smaller or larger than the previously input sealing gap, it may be determined that the sealing gap is defective.

Advantageous Effects

The device for measuring the sealing gap for the secondary battery according to an aspect of the present invention may include the first measurement device and the second measurement device to accurately measure the sealing gap disposed between the electrode assembly accommodation part and the sealing part of the pouch, thereby accurately determining whether the sealing gap is defective.

DETAILED DESCRIPTION

Figure 1:
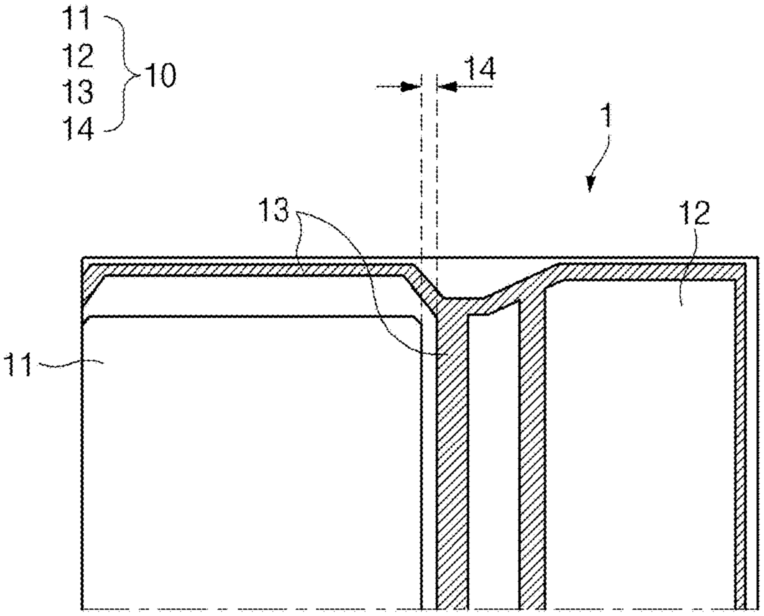
FIG. 1 is a cross-sectional view of a secondary battery to an embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Secondary Battery

FIG. 1 is a perspective view of an embodiment of a secondary battery to the present invention.

Referring to FIG. 1, a secondary battery 1 of an embodiment of the present invention includes an electrode assembly, an electrolyte (not shown), and a pouch 10 accommodating the electrode assembly and the electrolyte.

The electrode assembly has a structure in which a plurality of electrodes and a plurality of separators are alternately disposed. The plurality of electrodes may be positive and negative electrodes. Here, electrode tabs are provided on the plurality of electrodes, and electrode leads are coupled to the electrode tabs.

The pouch 10 includes an electrode assembly accommodation part 11 accommodating an electrode assembly, a gas pocket part 12 collecting a gas generated in the electrode assembly accommodation part 11, and a sealing part 13 sealing the electrode assembly accommodation part 11 and the gas pocket part 12, and the sealing part 13 includes a sealing surface sealing an edge of the electrode assembly accommodation part 11 and the gas pocket part 12, and a re-sealing surface sealing a gap between the electrode assembly accommodation part and the gas pocket part.

A sealing gap 14 is provided in a full-width direction of the pouch 10 (left and right direction of the pouch as viewed in FIG. 1) to prevent defects from occurring when sealing the pouch, and the sealing gap 14 is disposed between the electrode assembly accommodation part 11 and the sealing part 13. That is, the sealing gap 14 may be an extra space that is not sealed.

The sealing gap 14 requires a certain width to ensure safety, and thus, it is necessary to measure whether the sealing gap secured in the pouch is accurately secured. Here, a device for measuring the sealing gap for the secondary battery according to a first embodiment of the present invention may be used.

Hereinafter, the device for measuring the sealing gap for the secondary battery according to the first embodiment of the present invention will be described in detail with reference to the accompanying drawings.

Figure 2:
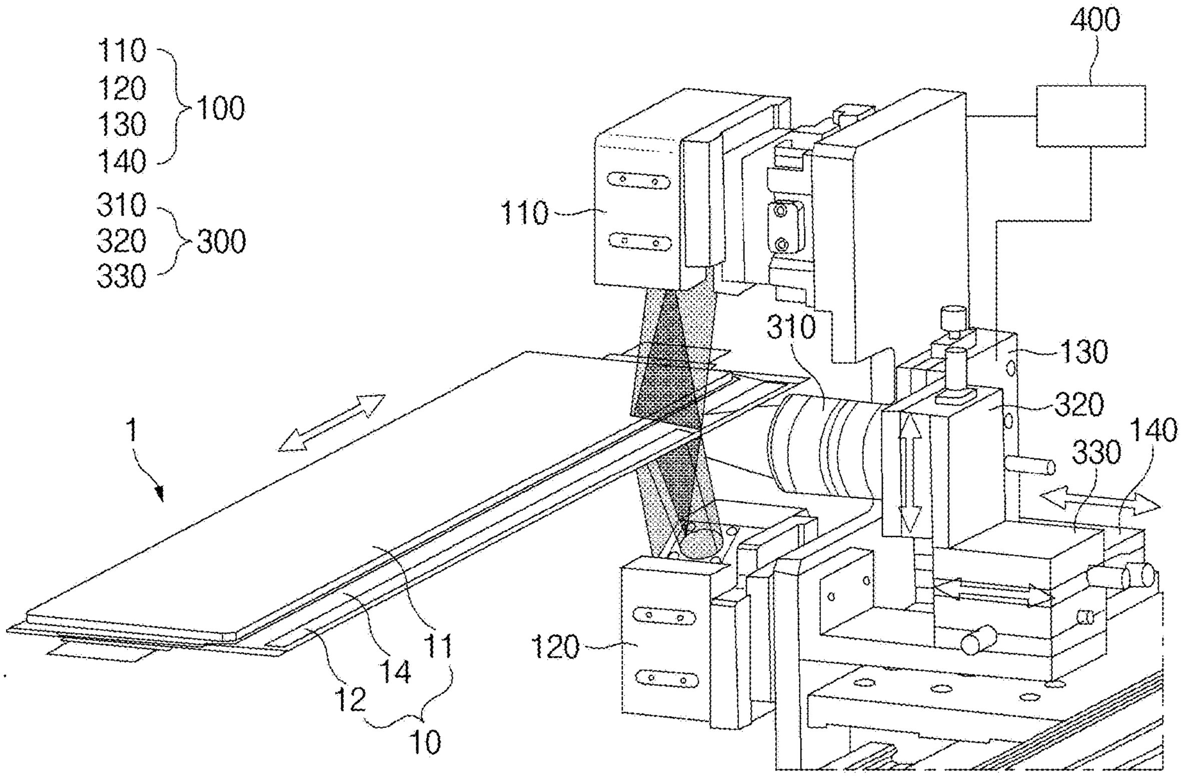
FIG. 2 is a perspective view illustrating a device for measuring a sealing gap for a secondary battery according to a first embodiment of the present invention.
Figure 3:
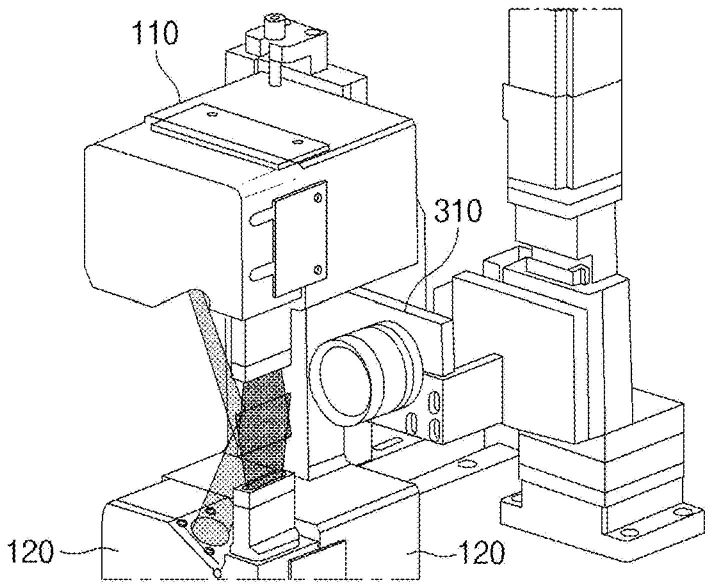
FIG. 3 is a partial enlarged view of FIG. 2.
Figure 4:
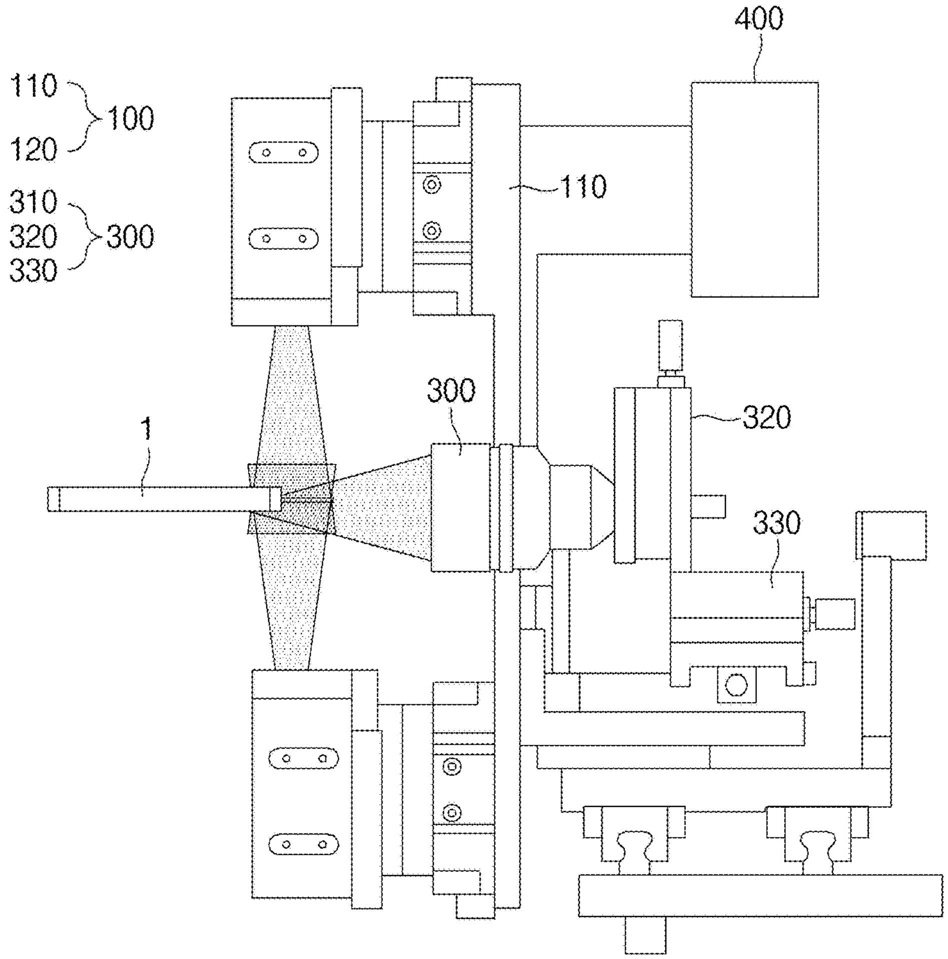
FIG. 4 is a front view of FIG. 2.
Figure 5:
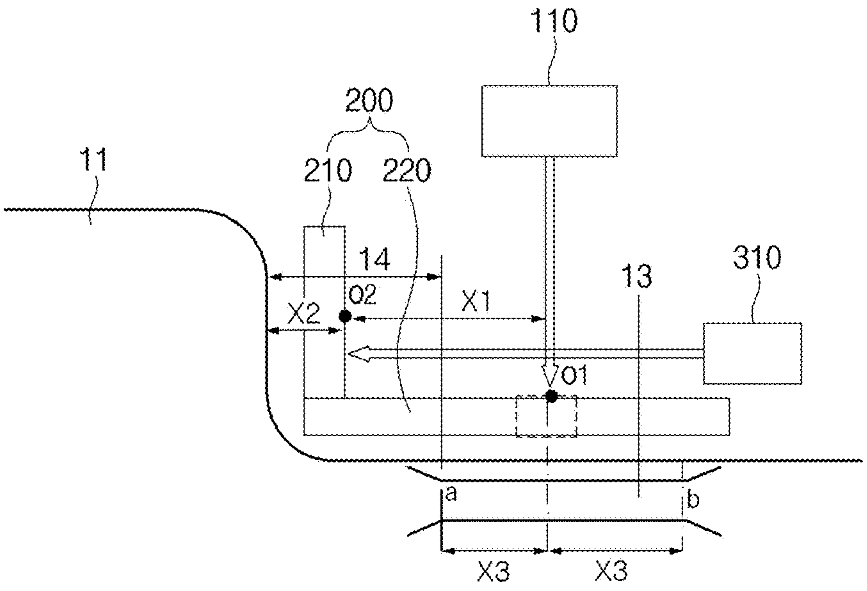
FIG. 5 is a view for explaining a sealing gap measurement state using the device for measuring the sealing gap for the secondary battery according to the first embodiment of the present invention.
Figure 6:
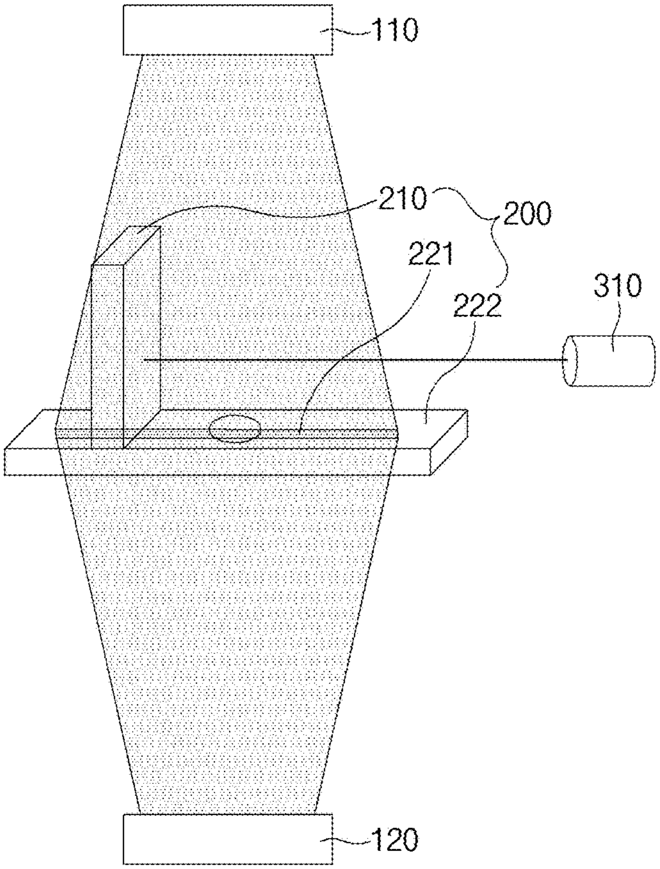
FIG. 6 is a perspective view illustrating an origin point structure of the device for measuring the sealing gap for the secondary battery according to the first embodiment of the present invention.
Figure 7:
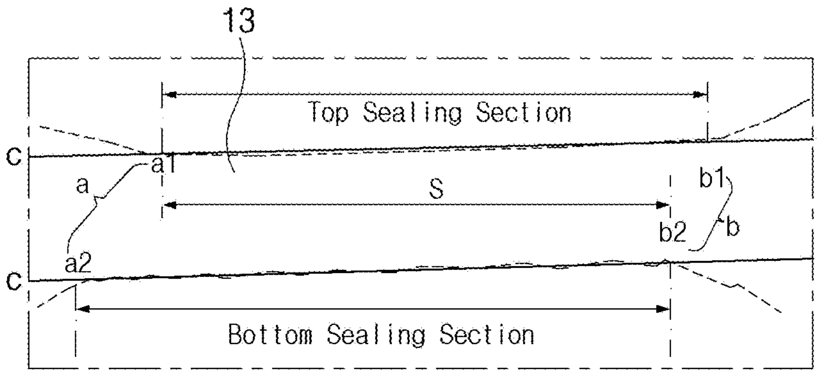
FIG. 7 is a view for explaining a state of measuring a sealing width of the device for measuring the sealing gap for the secondary battery according to the first embodiment of the present invention.

Device for Measuring Sealing Gap for Secondary Battery According to First Embodiment FIG. 2 is a perspective view illustrating the device for measuring the sealing gap for the secondary battery according to a first embodiment of the present invention, FIG. 3 is a partial enlarged view of FIG. 2, FIG. 4 is a front view of FIG. 2, FIG. 5 is a view for explaining a sealing gap measurement state using the device for measuring the sealing gap for the secondary battery according to the first embodiment of the present invention, FIG. 6 is a perspective view illustrating an origin point structure of the device for measuring the sealing gap for the secondary battery according to the first embodiment of the present invention, and FIG. 7 is a view for explaining a state of measuring a sealing width of the device for measuring the sealing gap for the secondary battery according to the first embodiment of the present invention.

The device for measuring the sealing gap for the secondary battery according to the first embodiment of the present invention is configured to measure the sealing gap disposed between the electrode assembly accommodation part and the sealing part of the pouch.

That is, as illustrated in FIGS. 1 to 4, the device for measuring the sealing gap for the secondary battery according to the first embodiment of the present invention may include a first measurement device 100, an origin point structure 200, a second measurement device 300, and a controller 400.

First Measurement Device

The first measurement device 100 is configured to acquire an inner start point and an outer end point of the sealing part.

That is, the first measurement device 100 acquires a sealing width S through the inner start point a and the outer end point b of the sealing part 13 provided in the pouch. In addition, a first reference origin point O1 is set within the sealing width S.

The sealing of the pouch is performed from the electrode assembly accommodation part toward the gas pocket part. A point at which the sealing starts is referred to as the inner start point a, and a point at which the sealing is ended is referred to as the outer end point b.

For example, the first measurement device 100 include a first displacement sensor 110 and a second displacement sensor 120, the first displacement sensor 110 and the second displacement sensor 120 are provided to correspond to both sides (upper and lower portions of the pouch when viewed in FIG. 1) with respect to the pouch 10, and a beam is irradiated onto a surface of the pouch to measure each of the inner start point a and the outer end point b of the sealing part 13. Thus, the first displacement sensor 110 and the second displacement sensor 120 acquire the sealing width S through a distance between the inner start point a and the outer end point b.

Referring to FIG. 7, the first displacement sensor 110 and the second displacement sensor 120 generate a virtual horizontal line c to match sealing surfaces that are respectively formed on both surfaces of the pouch 10, and a point deviating from the virtual horizontal line c with respect to the virtual horizontal line c is regarded as an area except for the sealing area to designate the inner start point a and the outer end point b. In addition, the sealing width S may be calculated by measuring a distance between the inner start point a and the outer end point b.

Each of the first displacement sensor 110 and the second displacement sensor 120 may be a line laser sensor. The line laser sensor refers to a device such as a scanner that reads information such as characters and figures existing on a surface of a paper or object.

The first measurement device 100 may further include a first vertical moving member 130. That is, the first vertical moving member 130 moves the first and second displacement sensors 110 and 120 toward both the surfaces of the pouch (top and bottom surfaces of the pouch when viewed in FIG. 2) or move the first and second displacement sensors 110 and 120 away from both the surfaces of the pouch. Thus, the first vertical moving member 130 may simultaneously move the first and second displacement sensors 120 in a direction toward the pouch or in an opposite direction thereof, and as a result, the distance may be adjusted so that the beam of the first and second displacement sensors 110 and 120 is accurately irradiated to the surface of the pouch.

In addition, the first measurement device 100 may further include a first full-width moving member 140. That is, the first full width moving member 140 moves the first and second displacement sensors 110 and 120 in the full-width direction of the pouch (a left and right direction of the pouch when viewed in FIG. 2) to locate the first and second displacement sensors 110 and 120 on the sealing part of the pouch. Thus, the first and second displacement sensors 110 and 120 may be accurately disposed on the sealing part of the pouch, and as a result, the sealing width of the sealing part may be accurately measured.

Origin Point Structure

The origin point structure 200 provides a vertical reference surface corresponding to a point that is moved by a predetermined first distance X1 from a first reference origin point O1 disposed between the inner start point and the outer end point in the direction of the electrode assembly accommodation part.

That is, the origin point structure 200 is configured to set a second reference origin point O2 for measuring the sealing gap, and a vertical reference surface 210 disposed at a point moved by the first distance X1 from the first reference origin point O1 in the direction of the electrode assembly accommodating part is provided. In addition, the origin point structure 200 moves the vertical reference surface 210 horizontally from the first reference origin point O1 toward the electrode assembly accommodation part by the first distance X1 and then set the point as the second reference origin point O2.

Here, the vertical reference surface 210 sets the second reference origin point O2 at a point that is not disposed within the sealing width S. This is done for preventing a measurement error from occurring due to the vertical reference surface when measuring the sealing width through the first and second displacement sensors 110 and 120.

Particularly, the origin point structure 200 may further include a horizontal reference surface 220 for locating the first and second displacement sensors 110 and 120 and the third displacement sensor 310 on the same vertical surface.

That is, the horizontal reference surface 220 extends long from a lower end of the vertical reference surface 210 in the direction of the sealing width, and a through-hole 221 through which the beam irradiated from the first displacement sensor 110 passes is defined. Thus, in the origin point structure 200, the beam of the third displacement sensor 310 is irradiated to the vertical reference surface 210, and the beam of the first displacement sensor 110 is irradiated to the through-hole of the horizontal reference surface 220. Thus, the first and second displacement sensors 110 and 120 and the third displacement sensor 310 may be adjusted to be disposed on the same line, and as a result, an occurrence of errors in measuring the sealing width may be minimized.

Second Measurement Device

The second measurement device 300 is configured to acquire a second distance X2 from the vertical reference surface to the electrode assembly accommodation part.

That is, referring to FIG. 5, the second measurement device 300 includes a third displacement sensor 310. The third displacement sensor 310 irradiates a beam toward the vertical reference surface 210 to set a point, at which the vertical reference surface 210 is disposed, as the second reference origin O2, and the beam is irradiated to the electrode assembly accommodating part 11 to pass through the second reference origin point O2, thereby acquiring the second distance X2 from the second reference origin O2 to the electrode assembly accommodating part 11.

The second measurement device 300 may further include a second vertical moving member 320. The second vertical moving member 320 allows the third displacement sensor 310 to ascend or descend so that the third displacement sensor 310 irradiates a beam toward the vertical reference surface 210 of the origin point structure 200. Thus, a position of the third displacement sensor 310 may be accurately adjusted so that the beam of the third displacement sensor 310 is irradiated to the vertical reference surface 210 of the origin point structure 200.

In addition, the second measurement device 300 may further include a second full-width moving member 250. The second full-width moving member 250 may move the third displacement sensor 310 forward or backward toward the pouch in order to adjust a distance between the third displacement sensors 310 based on the vertical reference surface 210. Thus, the distance between the vertical reference surface 210 and the third displacement sensor may be adjusted.

Controller

The controller 400 is configured to acquire the sealing gap based on the first distance X1, the second distance X2, and the third distance X3 from the inner start point to the first reference origin point O1.

That is, the controller 400 sets the first reference origin point O1 between the inner start point a and the outer end point b and acquires the third distance X3 from the inner start point a to the first reference origin point O1. The sealing gap may be acquired based on the first distance X1, the second distance X2, and the third distance X3.

For example, the controller 400 may acquire a value acquired by subtracting the third distance X3 from the sum of the first distance X1 and the second distance X2 as the sealing gap 14.

The controller 400 may set the first reference origin point O1 at a central point of the sealing width S. In this case, the distance between the inner start point and the first reference origin point and the distance between the outer end point and the first reference origin point are symmetrical to each other to improve efficiency of calculation.

When the inner start point a and outer end point b of the sealing part 13 measured by the first displacement sensor 110 and the second displacement sensor 120 do not match each other, the controller 400 sets overlapping points between the inner start point a and the outer end point b of the sealing part 13, which are respectively measured by the first displacement sensor 110 and the second displacement sensor 120, as the inner start point a and the outer end point b of the sealing part 13.

That is, when an inner start point a1 and an outer end point b1, which are measured by the first displacement sensor 110 match with an inner start point a2 and an outer end point b2, which are measured by the second displacement sensor 120, the controller 400 set overlapping points between the inner start point and the outer end point of the sealing part, which are measured by the first displacement sensor 110 and the second displacement sensor 120 as the inner start point and the outer end point of the sealing part.

In other words, referring to FIG. 7, the controller 400 sets the inner start point a1 of the overlapping surface of the upper sealing surface and the inner starting point a2 of the lower sealing surface as the inner starting point of the sealing unit and sets the outer end point b1 of the overlapping surface of the upper sealing surface and the outer end point b2 of the lower sealing surface as the outer end point of the sealing part. Thus, accuracy in measurement with respect to the sealing width S may be improved.

The controller 400 acquires a thickness of the sealing width based on the distance between the sealing width measured by the first displacement sensor 110 and the sealing width measured by the second displacement sensor 120. Thus, the thickness of the sealing width may be accurately measured without an additional device.

The controller 400 may determine that the sealing gap 14 measured by the second measurement device 300 as defective, if it is less or greater than the previously input sealing gap. Thus, defects in the sealing gap disposed in the pouch may be accurately measured and inspected. The input sealing gap may be set according to a size of the pouch and a capacity of the electrode assembly.

Therefore, the device for measuring the sealing gap for the secondary battery according to the first embodiment of the present invention may include a first measurement device 100, an origin point structure 200, a second measurement device 300, and a controller 400 to accurately measure the sealing gap provided in the pouch.

Hereinafter, a method for measuring a sealing gap for a secondary battery according to the first embodiment of the present invention will be described.

Figure 8:
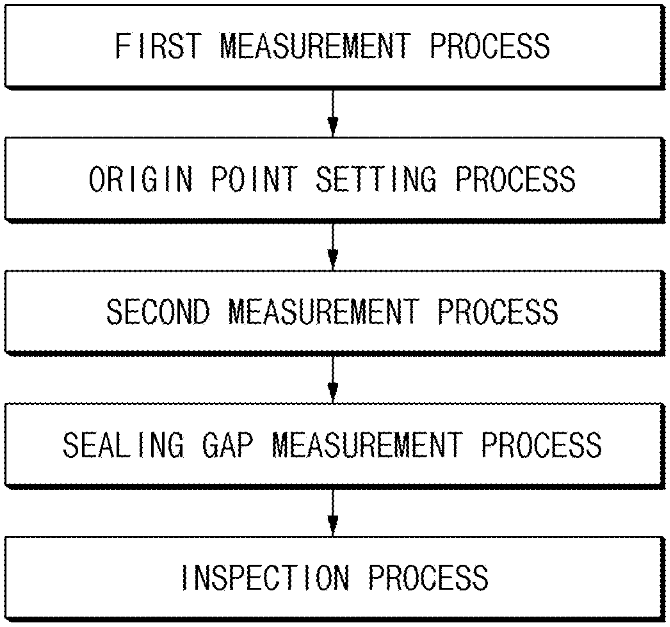
FIG. 8 is a flowchart illustrating a method for measuring a sealing gap for a secondary battery according to the first embodiment of the present invention.

Method for Measuring Sealing Gap for Secondary Battery According to First Embodiment FIG. 8 is a flowchart illustrating a method for measuring a sealing gap for a secondary battery according to the first embodiment of the present invention.

As illustrated in FIG. 8, the method for measuring the sealing gap for the secondary battery according to the first embodiment of the present invention is configured to measure a sealing gap disposed between an electrode assembly accommodation part and a sealing part of a pouch.

That is, the method for measuring the sealing gap for the secondary battery according to the first embodiment of the present invention includes a first measurement process, an origin point setting process, a second measurement process, and a sealing gap measurement process.

First Measurement Process

In the first measurement process, a first measurement device 100 is used, and the first measurement device 100 includes a first displacement sensor 110 and a second displacement sensor 120.

Figure 9:
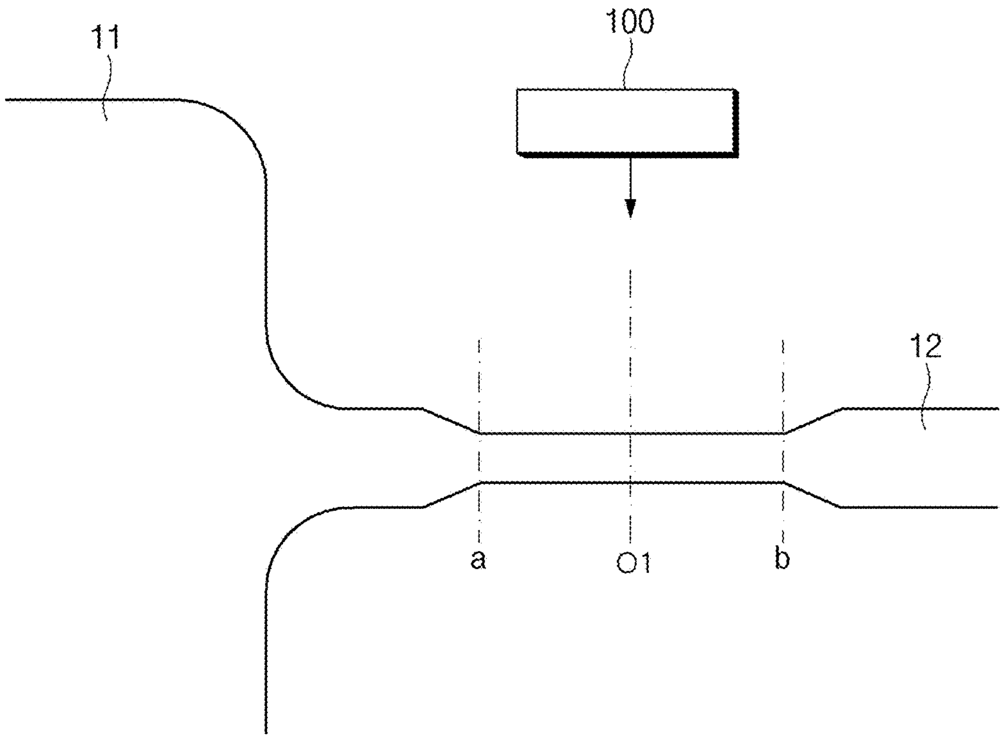
FIG. 9 is a schematic view of a first measurement process.

That is, in the first measurement process, as illustrated in FIG. 9, a sealing width S is acquired through an inner start point a and an outer end point b of a sealing part 13 provided in the pouch. Next, a first reference origin point O1 is set within the sealing width.

In other words, the first measurement step includes a first process of measuring an inner start point and an outer end point of the sealing part by irradiating beam on one surface of the pouch, and a second process of measuring an inner start point and an outer end point of the sealing part by irradiating beam on the other surface of the pouch.

In more detail, referring to FIG. 7, in the first measurement process, the inner start point and the outer end point of the sealing part formed on both sides of the pouch are measured through the first displacement sensor 110 and the second displacement sensor 120, which are provided on both surfaces of the pouch, respectively. For example, the first displacement sensor 110 measures the inner start point a1 and the outer end point b1 of the upper sealing surface formed on the top surface of the pouch, and the second displacement sensor 120 measures the inner start point a2 and the outer end point b2 of the lower sealing surface formed on the bottom surface of the pouch. In addition, the sealing width S is acquired by measuring the distance between the inner start point and the outer end point of the sealing surface measured by the first and second displacement sensors 110 and 120. Next, a first reference origin point O1 is set within the sealing width S.

Here, the first reference origin point may be set at a center point of the sealing width.

In the first measurement process, if the inner start points and the outer end points of the sealing part provided on both the surfaces of the pouch do not match, the points at which the inner start point and the outer end point of the sealing part provided on both the surfaces of the pouch overlap each other are set as the inner start point and outer end point of the sealing part, respectively.

That is, if the inner start points and the outer end points of the sealing part measured in the first process and the second process do not match, the first measurement process further includes a third process of setting the points at which the inner start point and the outer end point of the sealing part overlap each other as the inner start point and the outer end point of the sealing part, respectively.

For example, in the first measurement process, referring to FIG. 7, the inner start point a1 of the upper sealing surface and the inner start point a2 of the lower sealing surface is set, and the outer end point b1 of the upper sealing surface and the outer end point b2 of the lower sealing surface is set.

The first measurement process further includes a process of acquiring a thickness of the sealing width based on the distance between the sealing width measured in the first process and the sealing width measured in the second process. That is, the thickness of the sealing width may be acquired based on the distance between the sealing width measured by the first displacement sensor 110 and the sealing width measured by the second displacement sensor 120.

In the first measurement process, after setting the first reference origin point O1 between the inner start point a and the outer end point b, a third distance X3 between the inner start point a and the first reference origin point O1 is acquired.

Origin Point Setting Process

The origin point setting process uses an origin point structure 200, and the origin point structure 200 includes a vertical reference surface 210 and a horizontal reference surface 220.

Figure 10:
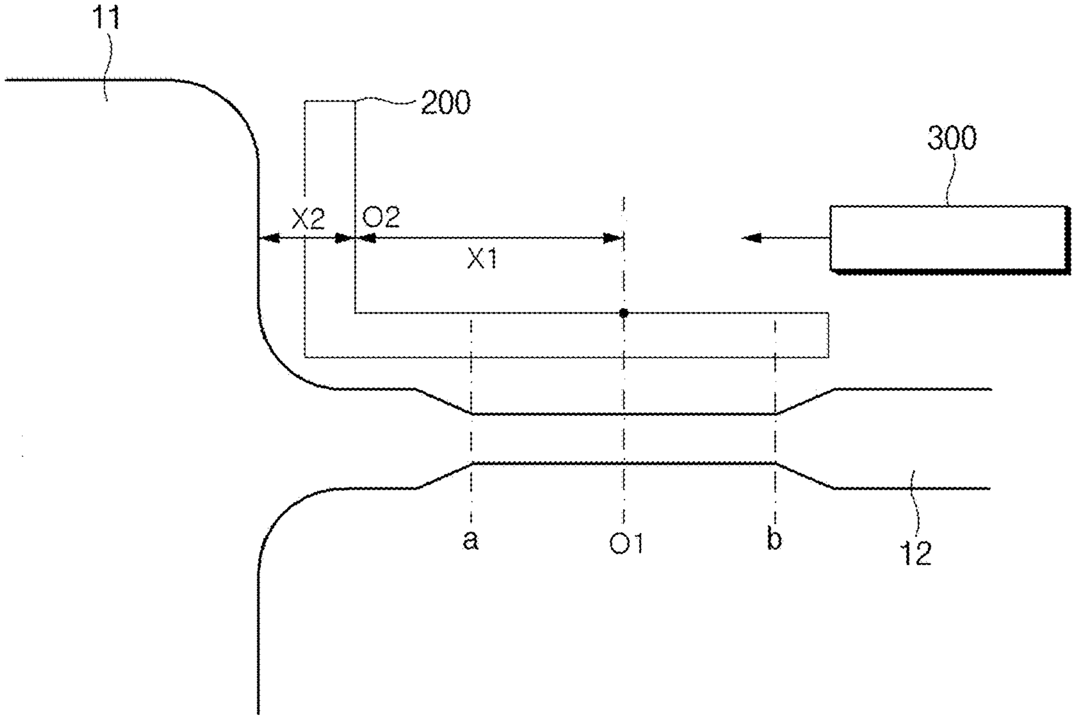
FIG. 10 is a schematic view of an origin setting process and a second measurement process.

That is, in the origin point setting process, as illustrated in FIG. 10, the vertical reference surface 210 corresponding to a point moved by a predetermined first distance X1 in a direction of the electrode assembly accommodation part from the first reference origin point O1 disposed between the inner start point a and the outer end point b is set.

In the origin point setting process, a beam irradiated from the first displacement sensor 110 passes through a through-hole 221 formed in the horizontal reference surface 220 of the origin point structure 200, and thus, the first and second displacement sensors 110 and 120 and the third displacement sensor 310 to be described later may be disposed on the same vertical surface. Here, the horizontal reference surface 220 extends in the sealing width direction from the lower end of the vertical reference surface 210. Thus, in the origin point structure 200, the beam of the third displacement sensor 310 is irradiated to the vertical reference surface 210, and the beam of the first displacement sensor 110 is irradiated to the through-hole of the horizontal reference surface 220. Thus, the first and second displacement sensors 120 and the third displacement sensor 310 may be adjusted to be disposed on the same line, and as a result, an occurrence of errors in measuring the sealing width may be minimized.

Second Measurement Process

The second measurement process uses a second measurement device 300, and the second measurement device 300 includes a third displacement sensor 310.

That is, in the second measurement process, a beam is irradiated toward the vertical reference surface 210 to set a point at which the vertical reference surface 210 is disposed as the second reference origin point O2, and then, the beam is irradiated to the electrode assembly accommodating part to pass through the second reference origin point O2, thereby acquiring the second distance X2 from the second reference origin O2 to the electrode assembly accommodating part 11.

In the second measurement process, the second reference origin point O2 is set so as not to be disposed between the inner start point and outer end point of the sealing part.

Sealing Gap Measurement Process

Figure 11:
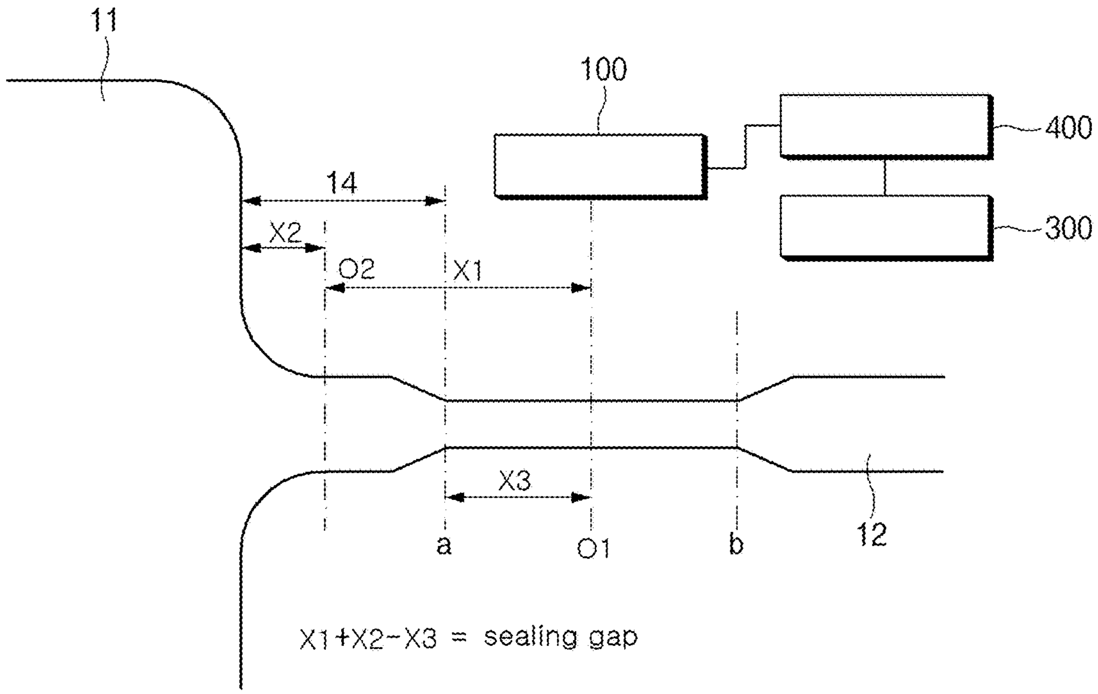
FIG. 11 is a schematic view of a sealing gap measurement process.

As illustrated in FIG. 11, in the sealing gap measurement process, the sealing gap is acquired based on the first distance X1, the second distance X2, and the third distance X3 from the inner start point to the first reference origin point O1.

That is, in the sealing gap measurement process, a value acquired by subtracting the third distance X3 from the sum of the first distance X1 and the second distance X2 may be acquired as the sealing gap.

The sealing gap measurement process may further include an inspection process of determining whether the measured sealing gap is defective.

That is, in the inspection process, if the measured sealing gap is less or greater than a previously input sealing gap, it is determined as a defect.

Therefore, in the method for measuring the sealing gap for the secondary battery according to the first embodiment of the present invention, the sealing gap may be accurately measured, and whether the sealing gap is defective may be accurately inspected.

Hereinafter, in descriptions of another embodiment of the present invention, constituents having the same function as the above-mentioned embodiment have been given the same reference numeral in the drawings, and thus duplicated description will be omitted.

Figure 12:
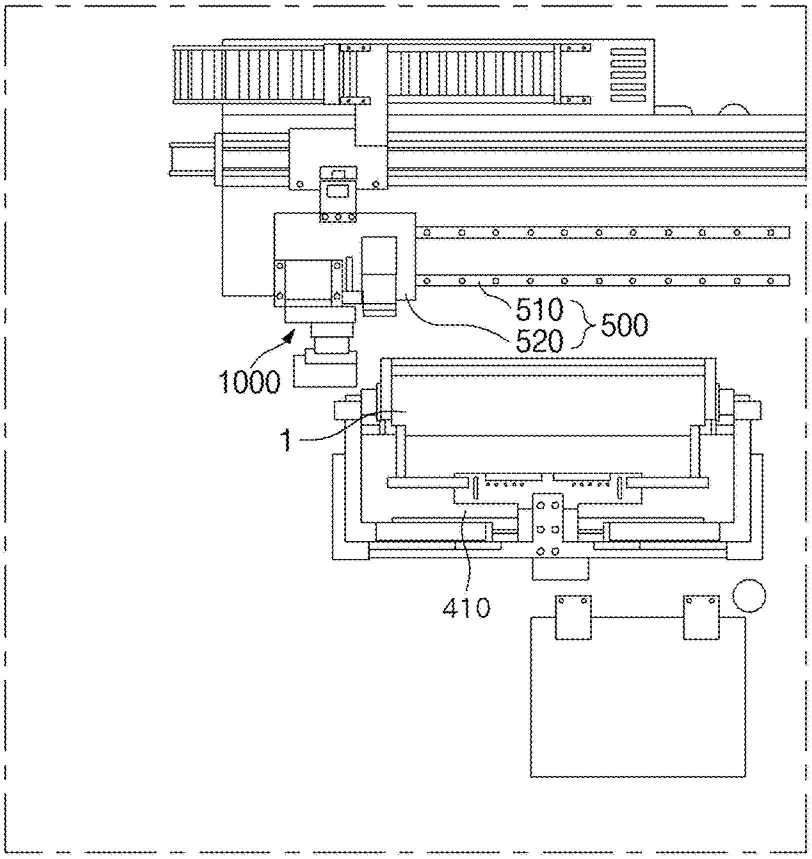
FIG. 12 is a plan view illustrating a device for measuring a sealing gap for a secondary battery according to a second embodiment of the present invention.

Device for Measuring Sealing Gap for Secondary Battery According to Second Embodiment As illustrated in FIG. 12, a device 1000 for measuring a sealing gap for a secondary battery according to a second embodiment of the present invention may include a first measurement device, an origin point structure, a second measurement device, and a controller.

The first measurement device, the origin point structure, the second measurement device, and the controller have the same configurations as the first measurement device, the origin point structure, the second measurement device, and the controller of the device for measuring the sealing gap for the secondary battery according to the first embodiment, and thus, redundant descriptions thereof are omitted.

Here, the device 1000 for measuring the sealing gap for the secondary battery according to the second embodiment of the present invention includes a jig device 410 on which a pouch is disposed and a guide device 500 that slidably moves the first and second measurement devices 100 and 300 in a full-length direction of a pouch.

The jig device 410 fixes the pouch without movement while disposing the pouch thereon.

The guide device 500 moves the jig device 410 in the full-length direction of the pouch to inspect whether the sealing gap formed in the pouch is defective on the whole. On the other hand, the guide device 500 includes a guide rail 510 formed in the full-length direction of the pouch, and a guide member 520 movably coupled to the guide rail 510 to move the jig device along the guide rail.

Therefore, the device for measuring the sealing gap for the secondary battery according to the second embodiment of the present invention may measure the entire sealing gap formed in the full-length direction of the pouch to inspect whether the sealing gap is defective on the whole.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

O1: First reference origin point
O2: Second reference origin point
S: Sealing width
1: Secondary battery
10: Pouch
11: Electrode assembly accommodation part
12: Gas pocket part
13: Sealing part
14: Sealing gap
100: First measurement device
110: First displacement sensor
120: Second displacement sensor
130: First vertical moving member
140: First full-width moving member
200: Origin point structure
210: Vertical reference surface
222: Horizontal reference surface
221: Through-hole
300: Second measurement device
310: Third displacement sensor
320: Second vertical moving member
330: Second full-width moving member
400: Controller
410: Jig device
500: Guide device
510: Guide rail
520: Guide member

The invention claimed is:

1. A device for measuring a sealing gap for a secondary battery disposed between an electrode assembly accommodation part and a sealing part of a pouch, the device comprising:

a first measurement device, including a first displacement sensor and a second displacement sensor, configured to acquire an inner start point of the sealing part and an outer end point of the sealing part in a sealing width direction;

an origin point structure having a vertical reference surface with a second reference origin point (O2), and a horizontal reference surface extending from the vertical reference surface in the sealing width direction, the horizontal reference surface having a first reference origin point (O1), wherein the second reference origin point (O2) is a point set on the vertical reference surface and spaced away from the first reference origin point (O1) by a predetermined first distance (X1) in the sealing width direction, wherein the first reference origin point (O1) is a point set on the horizontal reference surface and disposed between the inner start point of the sealing part and the outer end point of the sealing part in the sealing width direction;

a second measurement device, including a third displacement sensor, configured to acquire a second distance (X2) from the vertical reference surface to the electrode assembly accommodation part in the sealing width direction; and wherein a controller is configured to acquire a third distance (X3) as a distance extending from the inner start point to the first reference origin point (O1) in the sealing width direction, and wherein the controller is configured to acquire the sealing gap based on the first distance (X1), the second distance (X2), and the third distance (X3).

2. The device of claim 1, wherein the controller is configured to set the first reference origin point (O1) at a center point between the inner start point and the outer end point.

3. The device of claim 1, wherein the first displacement sensor is configured to irradiate a first beam to a first surface of the pouch, wherein the first displacement sensor is further configured to measure a first inner start point and a first outer end point based on the irradiation of the first surface by the first beam;

wherein the second displacement sensor configured to irradiate a second beam to a second surface of the pouch, and wherein the second displacement sensor is further configured to so as to measure a second inner start point and a second outer end point based on the irradiation of the second surface by the second beam.

4. The device of claim 3, wherein, if the first and second inner start points and the first and second outer end points do not match, the controller is configured to set the inner start point and the outer end point as points at which the first and second inner start points and the first and second outer end points overlap each other, respectively.

5. The device of claim 3, wherein a thickness of a sealing width is acquired based on a distance between a first sealing width measured by the first displacement sensor and a second sealing width measured by the second displacement sensor.

6. The device of claim 5, wherein the third displacement sensor is configured to irradiate a third beam toward the vertical reference surface, wherein the location of the second reference origin point (O2) is on the vertical reference surface at a point where the third beam contacts the vertical reference surface, wherein the third displacement sensor is further configured to irradiate the third beam to the electrode assembly accommodation part by passing the third beam through the second reference origin point (O2), and wherein the third displacement sensor is further configured to acquire the second distance (X2) from the second reference origin point (O2) to a point where the third beam contacts the electrode assembly accommodation part in the sealing width direction.

7. The device of claim 1, wherein the controller is configured to acquire a value for the sealing gap by subtracting the third distance (X3) from a sum of the first distance (X1) and the second distance (X2).

8. The device of claim 6, wherein the second reference origin point (O2) is not disposed within the sealing width.

9. The device of claim 5, wherein the horizontal reference surface includes a through-hole configured to allow the first beam irradiated from the first displacement sensor to pass therethrough.

10. The device of claim 1, wherein the controller is configured to determine whether the sealing gap measured by the second measurement device is defective when the sealing gap is less than or greater than a previously input sealing gap.

11. A method for measuring a sealing gap for a secondary battery disposed between an electrode assembly accommodation part and a sealing part of a pouch, the method comprising:

acquiring, with a first measurement device including a first displacement sensor and a second displacement sensor, an inner start point of the sealing part and an outer end point of the sealing part;

setting a first reference origin point (O1) between the acquired inner start point and the acquired outer end point in a sealing width direction of the sealing part, setting a vertical reference surface spaced away from a first reference origin point (O1) by a predetermined first distance (X1) from the electrode assembly accommodation part in the sealing width direction;

acquiring, with a second measurement device including a third displacement sensor, a second distance (X2) extending from the vertical reference surface in the sealing width direction acquiring, with a controller, a third distance (X3) as a distance extending from the inner start point to the first reference origin point (01) in the sealing width direction;

and acquiring the sealing gap based on the first distance (X1), the second distance (X2), and a third distance (X3).

12. The method of claim 11, wherein the first reference origin point (O1) is set at a center point between the inner start point and the outer end point.

13. The method of claim 11, wherein acquiring, with the first measurement device, the inner start point of the sealing part and the outer end point of the sealing part comprises:

irradiating a first beam to a first surface of the pouch and sensing a first inner start point and a first outer end point in a first process;

irradiating a second beam to a second surface of the pouch and sensing a second inner start point and a second outer end point in a second process;

when the first inner start point and second inner start point do not match, acquiring the inner start point as a point at which the first inner start point and second inner start point overlap; and when the first outer end point and second outer end point do not match, acquiring the outer end point as a points at which the first outer end point and second outer end point overlap.

14. The method of claim 13, wherein the first measurement process further comprises acquiring a thickness of a sealing width based on a distance between a first sealing width measured in the first process and a second sealing width measured in the second process.

15. The method of claim 11, wherein, in the second measurement process, a third beam is irradiated toward the vertical reference surface to set a second reference origin point (O2) on the vertical reference, and wherein the third beam is irradiated to the electrode assembly accommodation part by passing through the second reference origin point (O2), so as to acquire the second distance (X2) extending in the sealing width direction from the second reference origin point (O2) to the electrode assembly accommodation part.

16. The method of claim 15, wherein, in the second measurement process, the second reference origin point (O2) is set so as not to be disposed between the inner start point and the outer end point of the sealing part.

17. The method of claim 11, wherein a value for the sealing gap is determined by subtracting the third distance (X3) from a sum of the first distance (X1) and the second distance (X2).

18. The method of claim 11, further comprising determining whether a measured sealing gap is defective when the sealing gap is less than or greater than a predetermined sealing gap value.

* * * * *